United States Patent [19]
Muldner

[11] 3,914,901
[45] Oct. 28, 1975

[54] MAT FOR GROWING LAWNS OR OTHER VEGETATION AND PROCESS FOR PRODUCING SAME

[76] Inventor: Lawrence C. Muldner, 6259 Prospect Road, San Jose, Calif. 95129

[22] Filed: Nov. 25, 1974

[21] Appl. No.: 527,166

[52] U.S. Cl. .................... 47/56; 156/152; 156/252; 156/276; 47/58
[51] Int. Cl.² ..................... A01C 1/04; B32B 31/00
[58] Field of Search ............................. 47/56, 58, 9; 156/152–153, 276, 252, 297–298, 542, 547

[56] References Cited
UNITED STATES PATENTS

| | | | |
|---|---|---|---|
| 2,243,857 | 6/1941 | Fischer | 47/9 |
| 2,826,865 | 3/1958 | Chohamin | 47/56 |
| 2,909,003 | 10/1959 | Marshall | 47/56 |
| 2,976,646 | 3/1961 | Hansen et al. | 47/56 |
| 3,299,566 | 1/1967 | MacMullen | 47/1 |

FOREIGN PATENTS OR APPLICATIONS

| | | |
|---|---|---|
| 488,392 | 7/1938 | United Kingdom |

Primary Examiner—Robert E. Bagwill

[57] ABSTRACT

A mat for growing lawns or other vegetation comprising a continuous web sheet of organic fiber such as sphagnum peat moss with lawn or other seeds impregnated therein is formed by feeding the web sheet through drive rollers and past a scarfer. The scarfer removes the surface fiber of the sheet by abrasion, and the expanded removed fiber is drawn away by air induction and collected. The web then passes through a perforator, and thence to a sprayer which applies a binding substance. The web sheet then goes through a seed spreader which deposits seeds on the sheet with the optimum density, and thence to a peat applicator. The peat applicator deposits on the sheet a blanket of expanded peat fiber collected from the scarfer. The sheet passes through compression rollers which finish the lawn mat, which is then cut to size and taken up on rollers.

5 Claims, 8 Drawing Figures

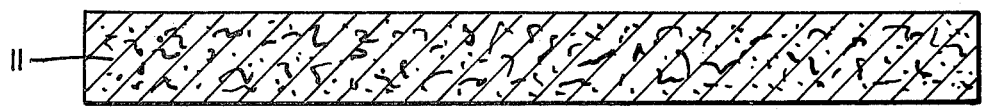
FIG_1
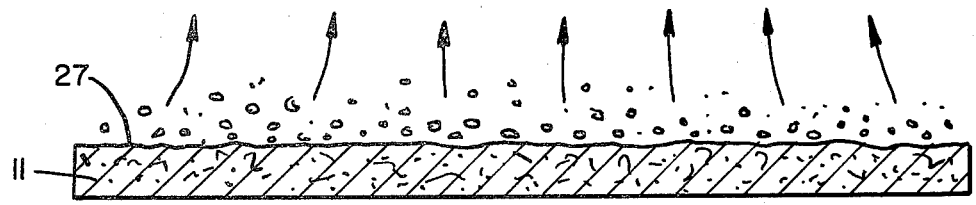
FIG_2
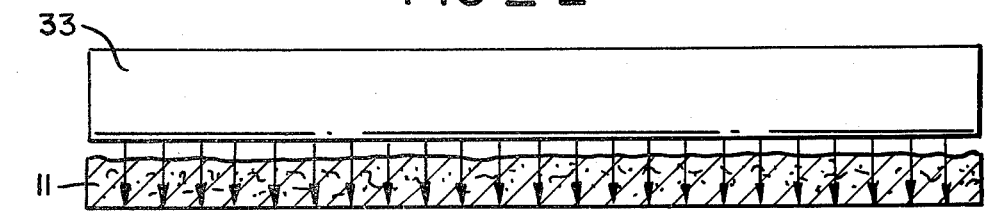
FIG_3
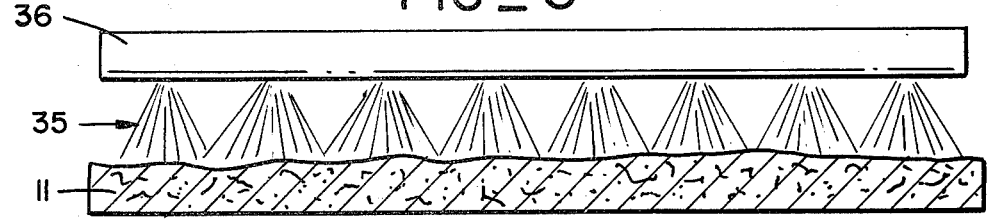
FIG_4
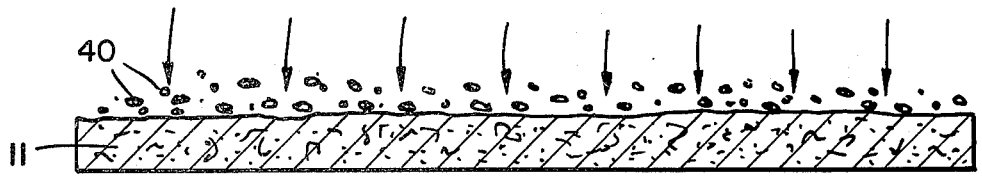
FIG_5
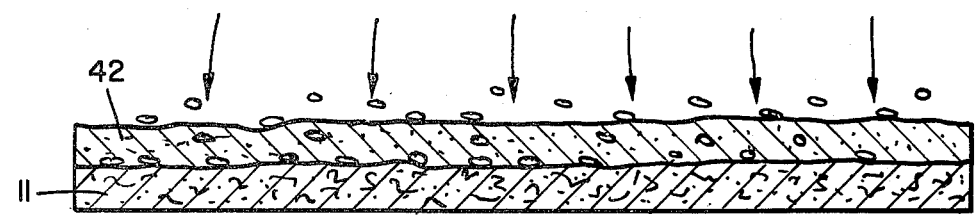
FIG_6
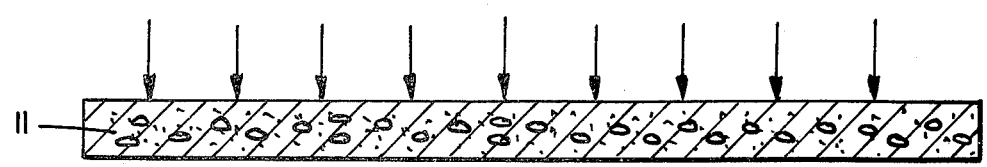
FIG_7

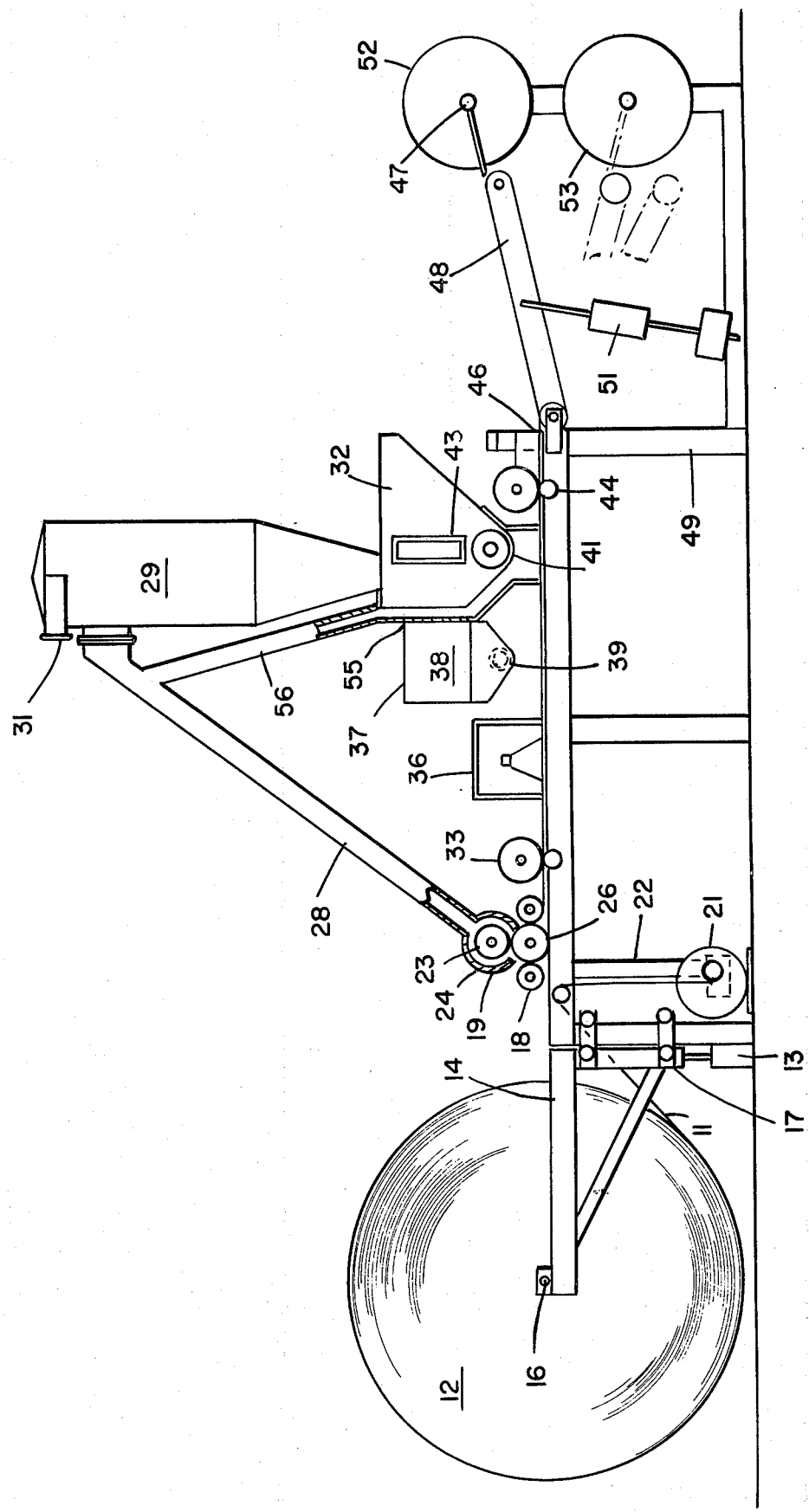
FIG_8

MAT FOR GROWING LAWNS OR OTHER VEGETATION AND PROCESS FOR PRODUCING SAME

BACKGROUND OF THE INVENTION

It is well known in the prior art to package viable seeds in a growing medium of web sheet form to facilitate handling of the seed and to provide favorable conditions for germination. These sheets generally comprise a fibrous mat substrate which is provided for strength, to which is applied a layer of organic substance which constitutes the growing medium. Usually the seeds are deposited on the layer of organic substance, and an adhesive or binding layer is applied over the seeds to join them to the sheet. Often a layer of soluble fertilizer is applied above or below the organic substance. Also, a semi-permeable or impermeable sheet of plastic or the like may be provided in this sandwich to help retain moisture and thus increase the possibility of seed germination. These are merely the general features of the many seed mats or tapes known in the prior art.

These prior art fabrications suffer from deficiencies attributable to the good intentions of their designers. That is, in the interest of promoting a high rate of germination within a short span of time, many layers of various materials are laminated together to provide the optimum in nutrients and moisture. These complex laminated sheets require costly materials, and complex machines for fabrication. When considering a web sheet material which must cover a large area, such as one for producing a lawn, the cost of materials and machinery can be prohibitive.

SUMMARY OF THE INVENTION

The present invention provides a mat for starting a lawn or other vegetation comprising a web sheet having viable seeds embedded therein, the sheet comprising an organic fiber such as sphagnum peat moss. The peat fiber provides sufficient strength to maintain the structural integrity of the sheet, and also provides an excellent growing medium for the seeds. Furthermore, the sheet can be manufactured in a dry state, with water added at the growing site to initiate germination of the seeds while also causing the web sheet to begin to degrade over an extended period of time. In fact, the slowness of the sheet disintegration provides for weed control, while permitting the newly formed roots to pass through the sheet and reinforce the same, thus actually further slowing down sheet disintegration. Thus the lawn mat provides an ideal growing medium, and leaves no organic residue after it degrades and becomes part of the soil. Also, because no water is present, the product possesses a lengthy shelf life.

The mat is produced in a novel process in which a continuous web sheet of sphagnum peat moss fiber is first fed from a supply roll through a scarfer. The scarfer abrades one surface of the web sheet, removing up to one-half of the sheet thickness and expanding the fibers on that surface. The removed material is removed by an air stream and stored for subsequent use. The web sheet is then directed through a perforator which punches regularly spaced holes in the sheet to enhance its porosity and promote drainage when installed at the growing site. The web sheet is thereafter fed through a binder applicator, in which multiple nozzles spray a binding substance such as sodium silicate onto the scarfed surfaces.

The web sheet then passes through a seed applicator which deposits lawn or other seed from a hopper onto the scarfed sprayed surface with optimum seed density per unit area. Thereafter the web sheet is directed through a sifter, in which the loose peat fiber collected from the scarfer is deposited as a protective blanket over the seeds. The sheet is then fed through a pair of compression rollers which compress the blanket with the binder and seeds to form the mat. The mat is then trimmed and wound onto a take-up mandrel.

THE DRAWING

FIGS. 1 through 7 depict the state of the mat after successive steps in the novel process of the present invention.

FIG. 8 is a front elevation of the machine used to produce the mat of the present invention.

DESCRIPTION OF THE PREFERRED EMBODIMENT

The present invention generally comprises a mat which is designed for convenient and efficient dispersal and germination of seed. Although the preferred embodiment may be described with respect to its use with lawn seed, it may be appreciated that the scope of the invention is not limited to such use, since other seeds could readily be substituted.

The lawn mat of the present invention generally consists of a roll stock of substantially all organic fiber, such as sphagnum peat moss, in which the seed is embedded. It is within the scope of the invention to employ roll stock of other similar fiber with similar properties, i.e., plant nutrient content, ease of degredation, and low cost. With reference to FIGS. 1 and 8, the roll stock 11 is provided on a supply roll 12 which is supported on a supply stand 13. The supply stand comprises a C-shaped bracket 14 which supports the ends of the mandrel 16 of the supply roll. The bracket 14 is mounted on a hydraulic cylinder 17 which translates vertically. This arrangement permits a supply roll to be floor loaded; that is, the bracket 14 is lowered, a supply roll is rolled on the floor into place within the C-cavity of the bracket, and the bracket is raised to support the supply roll mandrel in freely rotating fashion.

The roll stock is fed through drive rollers 18 to a scarfer 19. The drive rollers, the scarfer, and all other powered devices are driven by an electric motor 21 through a belt drive system 22 and a plurality of adjustable ratio gear reduction units. The scarfer comprises a rotating wire brush 23 or the like enclosed in a housing 24, the brush abrading the top surface 27 of the roll stock as it passes over roller 26. The abrasion process removes approximately one-half of the thickness of the roll stock, and renders the fibers of the top surface 27 expanded, as shown in FIG. 2. Actually, after this scarfing operation, the stock fibers appear similar to root hairs standing on end, and assist in locking the subsequently applied seeds in place. A vacuum line 28 connected to the housing 24 draws away the loosened fibers by vacuum suction action and delivers them to a separator 29. The air exhausts through port 31, and the fibers settle and fall into a hopper 32.

The roll stock then passes through a rotating perforating roller 33 which places a regular array of holes in the continuous web of the roll stock, as shown in FIG.

3. The holes enhance the porosity of the lawn mat, and aid the draining of the lawn after planting. The roll stock is then fed through a sprayer unit 36, which is provided with multiple nozzles to uniformly spray a binder substance 35 onto the surface 27 of the roll stock, as shown in FIG. 4. The binder substance may be sodium silicate or other suitable adhesive agent. The roll stock is then drawn beneath a seed applicator 37, which includes a seed hopper 38 which feeds a seed spreader 39. The spreader is adjustable to disperse the optimum amount of seed 40 onto the surface 27 of the roll stock, as depicted in FIG. 5. If desired, sand, fertilizer, fillers or other materials can likewise be applied to the surface at this time.

The roll stock then passes through an expanded peat applicator 43, which includes a sifter 41 fed by the hopper 32. The sifter deposits a uniform layer 42 of the scarfed, expanded peat fiber onto the surface 27 of the roll stock, as shown in FIG. 6. The layer 42 protects the seeds from loss or injury due to subsequent handling of the lawn mat, or to wind, weather and the like, and aids in delivering moisture to the seeds. The roll stock then passes through compression rollers 44, which drive the layer 42 into the seeds and binder, creating a smooth, continuously bound upper surface 27 on the roll stock, as seen in FIG. 7.

The roll stock is then trimmed by a knife 46, to form the finished lawn mat, and fed onto a quick release take-up mandrel 47. The mandrel ends are supported on a C-shaped bracket 48, which is hinged to the main frame 49. An hydraulic cylinder 51 joined medially to the bracket 48 raises and lowers the mandrel 47 from the operating position 52 to the load-unload position 53. The mandrel 47 is driven to take up the lawn mat and maintain tension on the roll stock during the fabrication process described in the foregoing.

It will be noted that the lawn mat formed according to the present invention requires only one continuous sheet of roll stock, which substantially reduces the complexity and cost of fabrication. Also, the fibers scarfed from the surface are returned to the roll stock, so that a minimum of fibers are wasted. To further minimize waste, a vacuum housing 55 is placed around the sifter 41, connected to the vacuum pipe 28 by a pipe 56. The housing retains all fiber not retained by the top surface 27, and returns it by vacuum suction to separator 29 and hopper 32.

The finished lawn mat provides an ideal nutrient environment for the lawn seed embedded therein, and the perforations permit the mat, when installed at the growing site, to drain properly. Also, the mat of the present invention, due to its fabrication entirely of peat fiber, degrades over a period of time and joins the soil on which it is planted.

I claim:

1. A method for producing a web sheet seed carrier, comprising the steps of providing a roll stock of nutritive organic fiber, abrading a surface of said roll stock to remove a portion of the fiber thereof, applying a binder substance to said surface, affixing viable seed to the binder substance on said surface of said roll stock, returning said removed fiber portion of said roll stock to said surface of said roll stock, and thereafter compressing said roll stock and returned fiber portion.

2. The method of claim 1, further including the step of perforating said roll stock with a uniform array of holes before said step of abrading said surface of said roll stock.

3. The method of claim 1, further including the steps of drawing away said removed fiber by vacuum suction means and retrieving said removed fiber with separator means.

4. A device for producing a continuous web sheet seed carrier, including drive means for feeding a fibrous roll stock through said device, abrading means for abrading a surface of said roll stock and removing a portion of the fiber thereof, means for collecting and storing said removed fiber, means for applying a binding agent to said abraded surface of said roll stock, means for dispersing seed on the agent applied to said surface of said roll stock, means for uniformly depositing said stored removed fiber on said dispersed seed, and means for compressing said uniformly deposited stored removed fiber, said seed, and said roll stock.

5. The device of claim 4, including perforating means for introducing an array of holes in said roll stock.

* * * * *